United States Patent [19]
Bumpstead et al.

[11] 3,937,870
[45] Feb. 10, 1976

[54] DEVICE FOR INSULATING AN ELECTRICAL WIRE JOINT

[75] Inventors: John Bumpstead, Glendora; Robert B. Costa, Covina, both of Calif.

[73] Assignee: Clemar Manufacturing Corporation, Glendora, Calif.

[22] Filed: Mar. 18, 1975

[21] Appl. No.: 559,429

Related U.S. Application Data

[63] Continuation-in-part of Ser. No. 495,878, Aug. 8, 1974, abandoned, which is a continuation of Ser. No. 322,851, Jan. 11, 1973, abandoned.

[52] U.S. Cl. .................. 174/87; 174/76; 174/138 F
[51] Int. Cl.² ........................................ H02G 15/08
[58] Field of Search ................... 174/87, 76, 91–93, 174/77 R, 74 A, 138 F; 339/114, 115 R, 115 C, 116 R, 116 C, 205, 208, 213

[56] References Cited
UNITED STATES PATENTS

| | | | |
|---|---|---|---|
| 3,504,099 | 3/1970 | Beinhaur | 174/76 X |
| 3,597,528 | 8/1971 | Penfield | 174/87 |
| 3,730,970 | 5/1973 | Johnson | 174/93 X |

Primary Examiner—Darrell L. Clay
Attorney, Agent, or Firm—Fulwider, Patton, Rieber, Lee & Utecht

[57] ABSTRACT

A device intended to receive two or more electrical conductors of the same or dissimilar size and to provide mechanical protection and electrical insulation for the electrical connection of said conductors, including a container for receiving the joined ends of the electrical conductors, the device including having side walls, a closed end wall and an open end and a plug member adapted to seal the open end of the casing. Passages are provided in the plug end or closed end for the extension therethrough of the electrical conductors. Cooperating locking means are provided on the plug and the casing member for mechanically interlocking the plug end casing and radial flaps are disposed in the passages which are deformed by the extension therethrough of the electrical conductor to define a cone shaped collar between the passage wall and the condutor to impede the flow of potting compound out of the device. A member may be disposed on the exterior or interior face of the plug or closed end containing the passages to define passage extensions for reinforcement of the end of the device having the passages.

11 Claims, 14 Drawing Figures

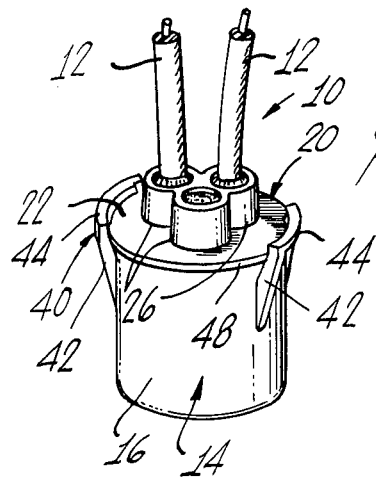
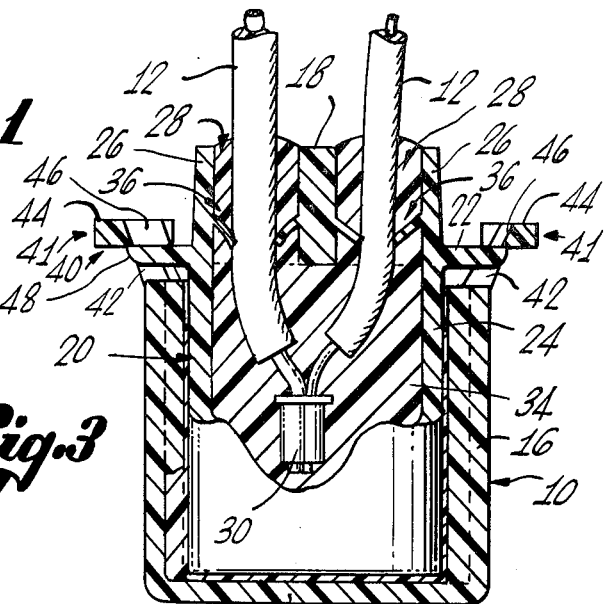
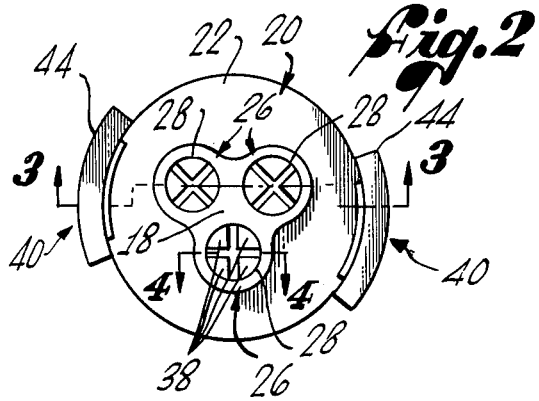
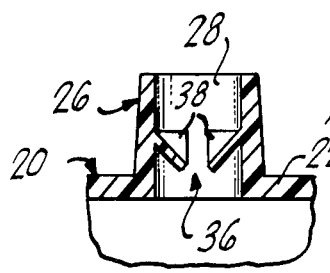
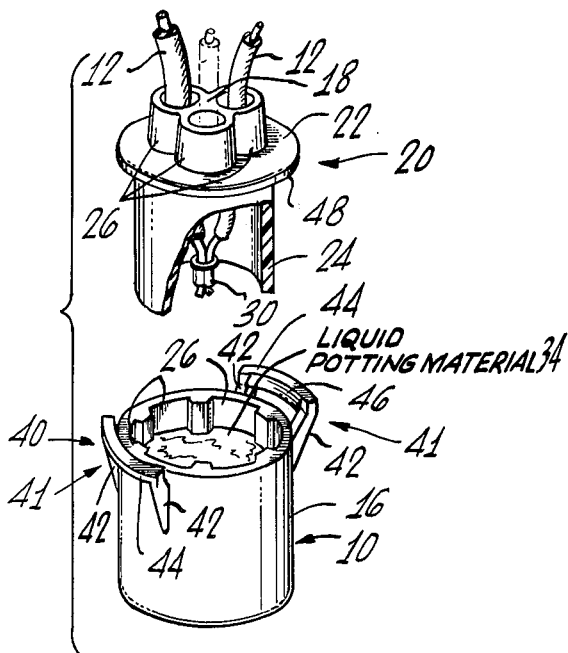
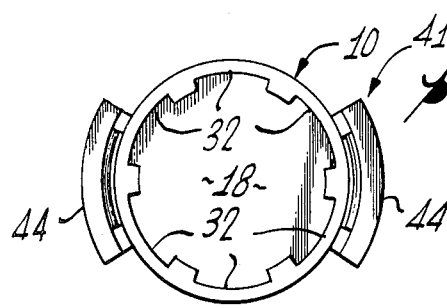

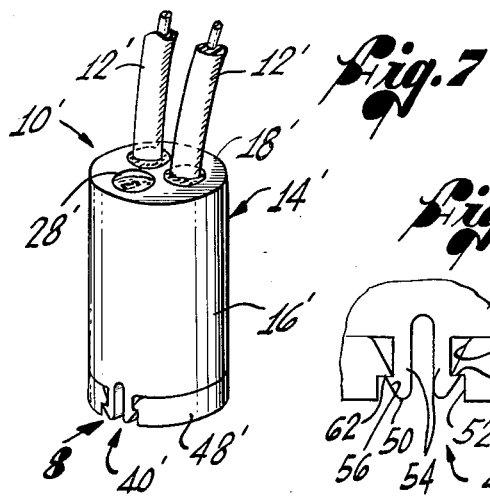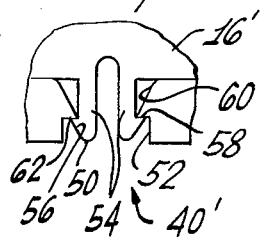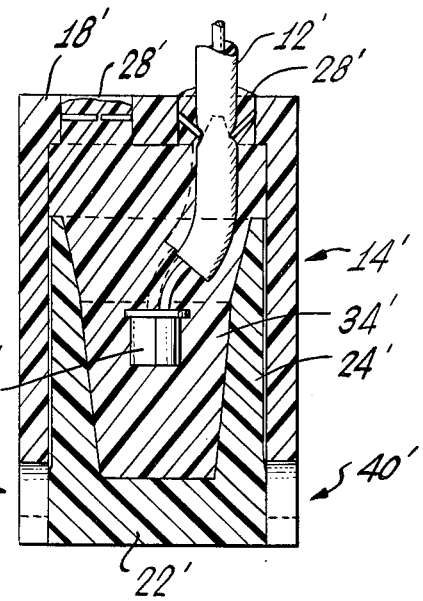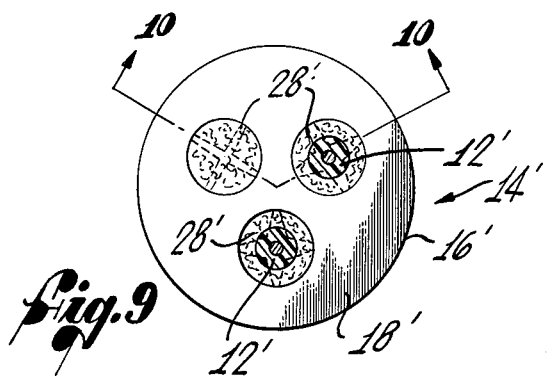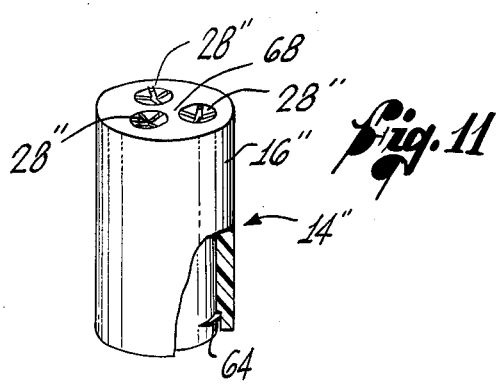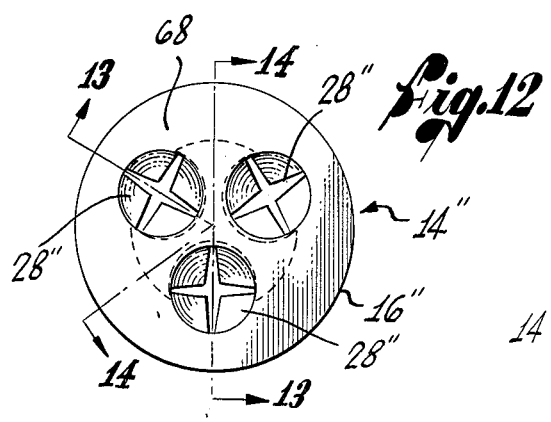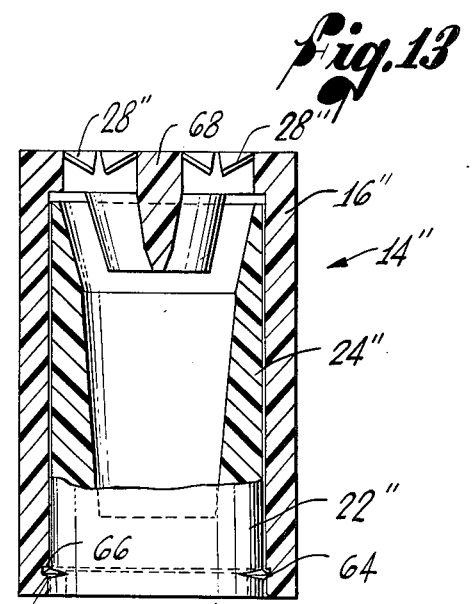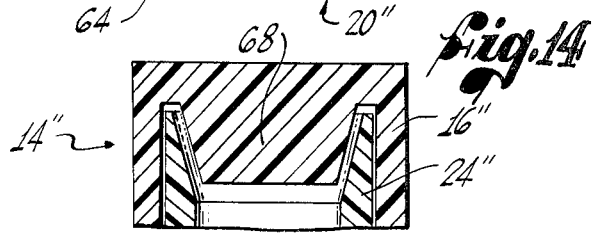

DEVICE FOR INSULATING AN ELECTRICAL WIRE JOINT

REFERENCE TO RELATED APPLICATIONS

This application is a continuation in part of application Ser. No. 495,878 filed Aug. 8, 1974, now abandoned, which is a continuation of application Ser. No. 322,851 filed Jan. 11, 1973, now abandoned.

BACKGROUND OF THE INVENTION

This invention relates to electrical connections and more particularly to a device for mechanically and electrically protecting the ends of two or more electrical conductors which have been joined together to form an electrical connection.

In the joining of electrical conductors, the mechanical and electrical protection of the united ends of the conductors is a major concern, particularly when the joined conductors are to be exposed to harsh environments, such as by being buried in the ground or being exposed to the elements. Various protective devices for insulating and mechanically protecting the joined electrical conductors have been known for a number of years, and by way of example, several general forms of such devices can be found in U.S. Pat. Nos. 997,066, 1,297,614, and 3,597,528.

Devices of the general type shown in the foregoing patents and of the general type to which the present invention relates, comprise a generally tubular member or casing having a side wall, a closed end wall, and an open end, and a second member or plug adapted to mate with the tubular casing an close off the open end of the casing. Passages are provided in either the end wall of the casing or that of the plug to permit the conductors to extend therethrough. To bond the casing and plug together, bonding and insulating compound or adhesive is disposed within the device and which substantially fills the interior of the device to anchor or bond the conductors therein and provide further electrically insulation for the joined conductors.

While such devices have had many desirable features, the problem of providing a good and reliable weather tight seal has not heretofore been satisfactorily solved. One major problem resides in the flow of the uncured bonding or potting compound, which is typically liquid in form, around the conductors and through the end wall passages during assembly of the plug and casing. This results in a wakened bond between the conductor and the passage walls, and also may result in voids or openings through which moisture may enter the device and short out the electrical circuit formed by the connection between the conductors.

A second problem resides in the possibility of a separation of the plug from the casing after assembly and which may result from internal pressures created by assembly of the plug and casing and by the evolution of gases during curing of the potting compound. If the plug separates appreciably from the casing, an effective bonding of the casing and plug will not result and a leak path to the interior of the device through which moisture may travel may be produced.

SUMMARY OF THE INVENTION

The present invention is embodied in new and improved device for protecting an electrical joint and of the type comprising, generally, a first member or casing having a closed end, a side wall, and an open end, and a second member or plug adapted to be telescoped with the casing to close the open end of the casing. Passageways are provided through either the end of the plug or the closed end of the casing, and through which electrical conductors can project to the interior of the device.

In accordance with the present invention, means are provided in the passageways for guiding and holding conductors inverted therein centrally in the passageways, and to restrict the flow of liquid potting compound out of the device through the annular spaces defined between the conductors and the inside walls of the passageways during assembly of the plug and casing. In this manner the formation of voids in the passageways due to the outflow of potting compound is substantially reduced, thereby preventing the inflow of moisture and providing a good and solid bond between the conductors and the walls of the passageways. Additionally, locking means are provided to secure the plug to the casing when assembled, and to prevent a subsequent separation of the plug from the casing.

Many other advantages and features of the present invention will become apparent from the following detailed description taken in conjunction with the accompanying drawings which disclose, by way of example, the principles of the invention.

BRIEF DESCRIPTION OF THE FIGURES

FIG. 1 is a perspective view of a assembled device in accordance with the present invention and showing a fragmentary portion of two coonductors projecting therefrom;

FIG. 2 is an enlarged top plan view of the device of FIG. 1 without the conductors;

FIG. 3 is an enlarged fragmentary cross-sectional view of the device shown in FIG. 1 taken substantially along line 3—3 of FIG. 2, and showing the joined ends of the conductors therein;

FIG. 4 is an enlarged fragmentary cross-sectional view taken substantially along line 4—4 of FIG. 2;

FIG. 5 is a top plan view of a casing forming a portion of the device shown in FIG. 1 before assembly;

FIG. 6 is an exploded perspective view, partly in section, of the device of FIG. 1, and showing a tubular plug of the assembly with a pair of electrical conductors extending therethrough, and a casing with a liquid or uncured potting material therein and which receives the plug to form the completed assembly;

FIG. 7 is a perspective view of another embodiment of the present invention showing two connectors extending through passages in an end wall of the device;

FIG. 8 is an enlarged fragmentary view taken in the direction of line 8 of FIG. 7;

FIG. 9 is an enlarged top plan view of the device of FIG. 7 with the electrical conductors shown in sections;

FIG. 10 is an enlarged side sectional view taken substantially along line 10—10 of FIG. 7;

FIG. 11 is a perspective view, partially broken away in cross-section, of another embodiment of the device of the present invention;

FIG. 12 is an enlarged top plan view of the device shown in FIG. 11;

FIG. 13 is a cross-sectional view taken substantially along line 13—13 of FIG. 12; and FIG. 14 is a fragmentary cross-sectional view taken substantially along line 14—14 of FIG. 12.

DETAILED DESCRIPTION

As shown in the exemplary drawings, the present invention is embodied in a new and improved device 10 for incapsulating an electrical connection formed by the union of the end portions of two or more electrical conductors 12. In this instance, with reference to the embodiment of FIGS. 1 through 6, the device 10 comprises a tubular cup shaped casing 14 having a generally cylindrical sidewall 16 and an integral closed end 18, and a tubular plug 20 formed by a disk-shaped cap 22 and a downwardly projecting, generally cylindrical sidewall 24 integrally formed with the cap and dimensioned to be telescoped into the casing so that the cap overlies the end of the sidewall of the casing remote from the closed end.

Herein formed through a central portion of the cap 22 are three openings, each having a circular cross-section and through which insulated electrical conductors 12 can project, in this instance, only two such conductors being illustrated. Upstanding from the cap 22 around each of the openings is a generally tubular projection 26, herein formed integrally with the cap and having its outer sidewall joined together with that of the others for strength adjacent the center of the cap (see FIG. 2), and which form three generally parallel elongated passageways 28 through which the conductors 12 extend into the device 10.

The electrical connection between the conductor 12 is formed prior to assembly of the plug 20 and casing 14. Initially, a portion of the ends of each of the conductors 12 is stripped of insulation, which typically is a solid polyvinylchloride plastic material, and the conductor ends are inserted through the passageways 28 into the plug 20. The stripped end portions of the conductors 12 are then united to form an electrical connection, herein by applying a metal crimp sleeve 30 of conventional design to the connection. Once the conductors 12 have been joined, the plug 20 is assembled with the casing 14 and with the connection fully inside the device 10.

Preferably, the casing 14 and the plug 20 are each formed from molded polyvinylchloride plastic with the sidewall 24 of the plug being dimensioned to be loosely received inside the sidewall 16 of the casing, and having a length less than that of the casing so that the cap 22 can seat against the open end of the casing. In this instance, the inside sidewall 16 of the casing 14 has longitudinal grooves 32 to form spaces between the sidewall 24 of the plug 20 and the casing.

To bond the casing 14 and plug 20 together, the casing is intitally substantially filed with a liquid potting compound 34 capable of producing a solvent weld in polyvinylchloride plastic, such as that manufactured and sold by Industrial Polychemical Service, P.O. Box 471, Gardena, Calif., under its number 1939 sealant, and consisting of a blend of solvents to which fifteen percent (15%) rigid polyvinylchloride plastic has been added. When the plug 20 is then assembled by telescoping its sidewall 24 inside the sidewall 16 of the casing 14, the liquid potting compound 34 will be displaced around the annular space between the sidewall of the plug and the sidewall of the casing, and outwardly through the passageways 28 around the conductors 12 to form a solvent weld type bond between the plastic insulation of the conductors and the wall of the passageways, and also between confronting portions of the plug and casing.

In accordance with one important aspect of the present invention, means 36 are provided in each passageway 28 to restrict the free flow of liquid potting compound 34 outwardly through the passageways from the device 10 when the plug 20 is initially assembled with the casing 14, and also to center each conductor 12 in its passageway to insure that some liquid potting compound completely surrounds each conductor and fills the annular space between the conductor and the inside sidewall of its passageway. Toward this end, radially projecting resilient tabs 38 are formed on the inside sidewall of each passageway 28 and which project inwardly toward the centers of the passageways, the tabs of each passageway herein taking the form of four slightly spaced generally triangular or pie-shaped members with the apices meeting adjacent the center of the generally circular passageway.

As can best be seen in FIGS. 2, 3, and 4, the tabs 38 are formed to also project axially toward the inside of the plug 20 prior to the insertion of a conductor 12 therethrough, and when a conductor is inserted, the tabs yield in an axial direction and form a conical collar to guide and hold the conductor in the center of the passageway 28. Moreover, the tabs 38 permit relatively large diameter passageways 28 to be provided in the device 10 so that conductors 12 of various sizes can be used with a single device.

In accordance with another important aspect of the present invention, the device 10 includes means to lock the plug 20 to the casing 14 when the plug has been fully inserted in the casing so that internal pressures will not force the plug to slide out of the casing. Toward this end, a snap acting lock 40 is provided between the casing 14 and the plug 20 and which will securely hold the plug in the fully assembled position so that the only expansion that can take place after assembly is expansion of the liquid potting compound 34 through the spaces 32 between the sidewall 24 and 16 of the plug and casing, respectively, and in the passageways 28, thereby further insuring that all potential voids between the elements of the device 10 are filled with potting compound.

As best shown in FIG. 3, the lock 40 of the first illustrated embodiment includes a pair of diametrically opposed ears 41 upstanding from the outside sidewall 16 of the casing 14, each comprising a pair of upwardly and laterally outwardly directed posts 42 connected at their outer ends by a horizontal arcuate member 44 having a beveled radially inner side 46. To cooperate with the ears 41 and lock the plug 20 to the casing 14, the outer rim 48 of the cap 22 portion of the plug has a diameter greater than the diametrical spacing between the radially inner most sides 46 of the arcuate members 44.

When the plug 20 is pressed into the casing 14, the rim 48 will engage and ride over the beveled sides 46, and by a cam action, flex the arcuate members 44 radially outwardly until the rim oves below the members, whereupon the members snap back to their initial position and overlie the rim, thereby locking the cap 22 below the members. In this manner, the plug 20 is securely locked to the casing 14 in the fully assembled position, and internal pressure created by a tendency of the liquid pottting compound 34 to expand will not result in the plug disassemblying or sliding out of the casing during setting of the potting compound.

Illustrated in FIGS. 7 through 10 is an alternative embodiment of a device 10' embodying the principle of the invention, with the structural or functional parts similar to those previously described in connection with the embodiment of FIGS. 1 through 6 being designated by corresponding primed reference numerals. In this embodiment, the conductors 12' project into the device 10' through passageways 28' provided through the closed end 18' of the casing 14', rather than through the cap 22' of the plug 20', and a different locking means 40' is provided.

To secure the plug 20' to the casing 14', the lock 40' comprises a pair of diametrically opposed ears in the form of generally U shaped projections 50 axially outstanding from the end of the sidewall 16' of the casing remote from the closed end 18', and which mate with radially disposed recesses 52 formed in diametrically opposed locations in the outer rim 48' of the cap 22' of the plug 20'. As best shown in FIG. 8, each U shaped projection 50 comprises a pair of spaced parallel posts 54 having tapered end portions 56 below which abutments or locking shoulders 58 are formed.

Oppositely disposed on the sides of lock recess 52 are a pair of tapered surfaces 60 and abutment surfaces 62 which cooperate with tapered end portions 56 of the parts 54 and the associated locking shoulders 58 to secure the cap 22' to the casing 14'. When the plug 20' is assembled with the casing 14', the tapered surfaces 60 of the plug ride over the tapered end portions 56 of the casing and deflect the posts 54 toward each other until the locking shoulders 58 can snap over the abutment surfaces 62 and thereby lock the plug to the casing.

In use, the device 10' of FIGS. 7 through 10 is substantially the same as that of the embodiment of FIGS. 1 through 6. The conductors 12' are stripped and inserted through the passageways 28' into the casing 14' and united together, herein by a crimp sleeve 30'. The casing 14' is then filled with liquid potting compound 34', and the plug 20' inserted with the recesses 52 aligned with the U-shaped projections 50. When the plug 20' is fully depressed into the casing 14', the liquid potting compound 34' is displaced around the sidewalls of the conductors 12' by extrusion through the gaps between the tabs 38', and also into the annular space between the sidewall 24' of the plug and the sidewall 16' of the casing.

Once assembled, the device 10' can be left unattended as the potting compound 34' cures and sets into a solid insulating mass since the outflow of potting compound is restricted by the tabs 38' and the plug 20' is locked to the casing 14'. When the potting compound 34' is completely cured, the device 10' forms a solid crush resistant, waterproof, and electrically insulating incapsulation of the connection between the conductors 12', and one which will meet current Underwriters Laboratory standards (U.L. Standard No. 493) for devices of this type to be used in underground instillations.

A third embodiment of a locking means 40" in accordance with the present invention for use in a device 10" of the type contemplated by the invention, is illustrated in FIGS. 11 through 14, parts of which having correspondence in structure and function with parts in the embodiments of FIGS. 1 through 10 being designated by corresponding double primed reference numerals. In this instance, the plug 20" telescopes completely into the casing 14" and the outer rim 48" of the cap 22" does not extend beyond the sidewall 24" of the plug.

As can best be seen in FIGS. 11 and 13, the lock 40" herein comprises a pair of drametrically opposed ears 64 projecting radially from the sidewall 24" of the plug 20" adjacent the cap 22"', and are received, when the plug is fully assembled with the casing 14"', in an annular groove 66 around the inside of the sidewall 16" of the casing adjacent the end remote from the closed end 18". When received in the groove 66, the ears 64 about the sides of the groove to securely lock the plug 20" to the casing 14", thereby preventing subsequent disassembly or removal of the plug from the casing.

Like the embodiment of FIGS. 7 through 10, the device 10" of FIGS. 11 through 14 provides passageways 28" through the closed end 18" of the casing 14" and within which the tabs 38" for centering the conductors and restricting outflow of liquid potting compound are disposed. Additionally, as best seen in FIGS. 12 and 14, the device 10" of the embodiment includes a raised center portion 68 surrounding a portion of the passageways 28" within the casing 14" and which functions to add crush resisting strength to the closed end of the casing when the device is in use.

From the foregoing, it should be apparent that the present invention provides a new and improved device for encapsulating an electrical connection between two or more conductors, and which forms a crush resistant, waterproof, and electrically insulating housing for such a connection. The device is relatively inexpensive to manufacture, easy to assemble, and highly reliable in use, and although only three passageways and two conductors have been illustrated in the drawings, it will be appreciated that additional passageways and conductors can be provided without change in the function or basic structure of the device.

While specific forms of the invention have been illustrated and described, it should also be apparent that various modifications and variations can be made without departing from the spirit and scope of the invention as defined by the following claims.

We claim:

1. In a device protecting the joined ends of two or more electrical conductors, and which includes a tubular casing having a side wall, an end wall, and an open end, and a closure member assembled with the casing and having an end wall closing the open end of the casing and defining therewith an internal space, at least two passageways through one of the end walls to the internal space, at least two conductors projecting through the passageways and electrically joined within the internal space, and a bonding compound disposed within the internal space, the improvement comprising:
   a plurality of generally radially inwardly extending flexible tabs disposed on the inner sidewalls of said passageways centering and holding the electrical conductors and substantially impeding the flow of uncured bonding compound out of said internal space.

2. The improvement as defined in claim 1 in which said tabs of each of said passageways comprise generally triangular shaped projections extending generally radially inwardly from the inner sidewall of said passageway with the apices of each tab projecting toward the center of said passageway.

3. The improvement as defined in claim 1 wherein said device includes at least one passageway without a conductor projecting therethrough, said flexible tabs in said one passageway being deformed outwardly away from said internal space by the pressure of said uncured bonding compound flowing through said one passageway and substantially closing said one passageway to impede the flow of said uncured bonding compound out of said internal space.

4. In a device protecting the joined ends of two or more electrical conductors, and which includes a tubular casing having a sidewall, an end wall, and an open end, and a closure member assembled with the casing and having an end wall closing the open end of the casing and defining therewith an internal space, at least two passageways through one of the end walls to the internal space, at least two conductors projecting through the passageways and electrically joined within the internal space, and a bonding compound disposed within the internal space, the improvement comprising:
   cooperative means on said casing and said closure member securing said casing and said closure member together; and
   a plurality of generally radially inwardly extending flexible tabs disposed on the inner sidewalls of said passageways centering and holding the electrical conductors and substantially impeding the flow of uncured bonding compound out of said internal space.

5. The improvement as defined in claim 4 wherein said tabs are deformed toward said internal space by the insertion of said electrical conductors through said passageways to define generally conical collars about said electrical conductors, said collars extending radially inwardly between the inner sidewalls of said passageways and said electrical conductors.

6. The improvement as defined in claim 4 wherein said device includes at least one passageway without a conductor projecting therethrough, said flexible tabs in said one passageway being deformed outwardly away from said internal space by the pressure of said uncured bonding compound flowing through said one passageway and substantially closing said one passageway to impede the flow of said uncured bonding compound out of said internal space.

7. The improvement as defined in claim 4 wherein said cooperative means include a radially outwardly extending flange on said closure member adjacent its closed end, and cooperating means on said casing adjacent its open end which coact therewith to engage and hold said casing and closure member in assembled relation.

8. A device for encapsulating an electrical connection between the ends of two or more electrical conductors, said device comprising:
   a tubular plastic casing having one end closed and one end open;
   a tubular plastic plug having one end closed and one end open and a sidewall assembled in telescopic relation with said casing to close the open end of said casing and to define therewith an internal space;
   a plurality of through passageways in one of said closed ends and adapted to receive electrical conductors therethrough;
   and a plurality of generally radially inwardly projecting flexible tabs disposed on the inner sidewall of each of said passageways and adapted to center and hold an electrical conductor to be inserted through said passageway.

9. A device as defined in claim 8 further including cooperative snap lock means on said casing and said plug securing said casing and plug together.

10. The improvement as defined in claim 9 in which said tabs of each passageway comprises generally triangular projections which extend radially inwardly from the inner sidewall of said passageway with the apices of each tab meeting adjacent the center of said passageway.

11. The improvement as defined in claim 10 in which said cooperative snap lock comprises diametrically opposed abutment means on said casing receiving and retaining corresponding opposed abutment means formed on the plug.

* * * * *